US009580287B2

(12) United States Patent
Park et al.

(10) Patent No.: US 9,580,287 B2
(45) Date of Patent: Feb. 28, 2017

(54) APPARATUS FOR PREVENTING BEER STONE FORMATION AND GAS-INDUCED FOAMY BEER-SPURTING PHENOMENON

(71) Applicant: Jong Ha Park, Seoul (KR)

(72) Inventors: Jong Ha Park, Seoul (KR); Jung Ho Cho, Yangju-si (KR)

(73) Assignee: Jong Ha Park (KR)

( * ) Notice: Subject to any disclaimer, the term of this patent is extended or adjusted under 35 U.S.C. 154(b) by 0 days.

(21) Appl. No.: 14/385,049

(22) PCT Filed: May 22, 2013

(86) PCT No.: PCT/KR2013/004472

§ 371 (c)(1),
(2) Date: Sep. 12, 2014

(87) PCT Pub. No.: WO2014/109439

PCT Pub. Date: Jul. 17, 2014

(65) Prior Publication Data

US 2015/0059872 A1 Mar. 5, 2015

(30) Foreign Application Priority Data

Jan. 9, 2013 (KR) ........................ 10-2013-0002353
May 22, 2013 (KR) ........................ 10-2013-0057505

(51) Int. Cl.
*F16K 31/18* (2006.01)
*B67D 1/07* (2006.01)
(Continued)

(52) U.S. Cl.
CPC ............ *B67D 1/07* (2013.01); *B67D 1/0003* (2013.01); *B67D 1/0042* (2013.01);
(Continued)

(58) Field of Classification Search
CPC ......... Y10T 137/7323; Y10T 137/3099; Y10T 137/3084; Y10T 137/3003;
(Continued)

(56) References Cited

U.S. PATENT DOCUMENTS 2,645,450 A * 7/1953 Chessman ............ F16K 27/041 137/625.48
2,892,576 A * 6/1959 Ward .................. B65D 83/546 137/614.11
(Continued)

FOREIGN PATENT DOCUMENTS

EP 641736 A 3/1995
EP 2192077 A1 6/2010
(Continued)

OTHER PUBLICATIONS

Machine translation of JPH10236591, retrieved from Espacenet, from the internet on Oct. 30, 2015 URL;(https://www.espacenet.com).*

*Primary Examiner* — Craig J Price

(57) ABSTRACT

An apparatus for preventing the formation of beer stones and a gas-induced phenomenon, in which foamy beer spurts out of a draught beer container, is disposed in a pipe between the draught beer container and a draught beer dispensing apparatus so as to prevent the gas-induced phenomenon from occurring when the beer is discharged from the draught beer container to the draught beer dispensing apparatus, and to remove and prevent the formation of beer stones deposited on the inner surface of the pipe, between the draught beer container and the draught beer dispensing apparatus, or on the inner surface of the draught beer dispensing apparatus.

6 Claims, 12 Drawing Sheets

100

(51) Int. Cl.
*B67D 1/08* (2006.01)
*B67D 1/00* (2006.01)
*B67D 1/12* (2006.01)

(52) U.S. Cl.
CPC ......... *B67D 1/0831* (2013.01); *B67D 1/0841* (2013.01); *B67D 1/125* (2013.01); *B67D 1/1245* (2013.01); *B67D 1/1252* (2013.01); *Y10T 137/7323* (2015.04)

(58) Field of Classification Search
CPC ......... Y10T 137/2984; Y10T 137/2987; Y10T 137/3028; Y10T 137/3056; Y10T 137/3068; Y10T 137/7358; Y10T 137/7361; B67D 1/0042; B67D 1/07; B67D 1/1245; B67D 1/0003; B67D 1/1252; B67D 1/125; B67D 1/00; B67D 1/06; B67D 1/08; B67D 1/0831; B67D 1/0841; F16K 21/00; G05D 7/0146; G05D 7/016; G05D 7/0166
USPC ......... 137/170.1, 170.2, 171, 179, 188, 192, 137/197, 202, 398, 399, 409, 410; 251/144, 318–320, 324, 246, 347
See application file for complete search history.

(56) References Cited

U.S. PATENT DOCUMENTS 2,906,492 A * 9/1959 Conrad ..................... F16K 1/46 251/325
2,979,080 A * 4/1961 Hewitt ................ F16K 11/0716 137/625.68
3,578,285 A * 5/1971 Carlton ................... F16K 31/50 251/144
3,790,128 A * 2/1974 Hempelmann ........ B23Q 35/36 137/614
4,004,610 A * 1/1977 Theriot ................... F16K 17/00 137/107
4,098,291 A * 7/1978 Clark .................... F16K 11/085 137/625.68
4,202,330 A * 5/1980 Jariabka ................ A61M 16/20 128/204.18
4,381,099 A * 4/1983 Knedlik ............... B67D 1/1438 222/504
4,516,596 A * 5/1985 Sugisawa .............. B08B 9/0323 137/240
4,524,951 A * 6/1985 Green ................. F16K 11/0655 137/625.25
4,657,162 A * 4/1987 Folter .................. B67D 1/0412 222/402.25
4,941,593 A 7/1990 Hicks et al.
4,995,421 A * 2/1991 Bonacorsi ............... F16K 11/07 137/383
5,054,514 A * 10/1991 Valdes Marin ........... E03B 9/20 137/454.2
5,090,440 A * 2/1992 Ladouceur ............ B08B 9/0323 137/209
5,165,654 A * 11/1992 Liu ........................... F24C 3/12 251/121
5,337,786 A * 8/1994 Rush ....................... F15B 13/04 137/625.68
5,564,459 A * 10/1996 Dunne ................. B67D 1/1247 137/170.2
5,699,829 A * 12/1997 Weiler, Jr. ............... F16K 31/48 137/383
6,003,542 A * 12/1999 Pizzacalla ............ B67D 1/1247 137/210
6,062,427 A * 5/2000 Du ....................... B67D 1/0831 137/113
6,312,595 B1 * 11/2001 Chien ..................... C02F 1/003 210/223
6,622,988 B2 * 9/2003 Gill ...................... A47G 21/185 220/703
6,871,763 B2 * 3/2005 Tsutsui ................... B65D 83/54 222/402.16
8,672,289 B2 * 3/2014 Fenwick ................... F16K 1/14 137/410
2005/0115607 A1 * 6/2005 Inoue ................... B67D 1/1247 137/170.2
2010/0151100 A1 * 6/2010 Wasmuht ............... B01D 29/01 426/495
2012/0228337 A1 * 9/2012 Gandy ................... B65D 83/70 222/402.25

FOREIGN PATENT DOCUMENTS

JP 06227593 8/1994
JP 10250796 9/1998
JP 10258896 9/1998
JP H10236591 A 9/1998
JP 11344141 12/1999
JP 2001240194 9/2001
JP 2005163811 6/2005
KR 19937003201 A 11/1993
KR 20010020665 A 3/2001
KR 200337470 1/2004
KR 20100102240 A 9/2010

* cited by examiner

APPARATUS FOR PREVENTING BEER STONE FORMATION AND GAS-INDUCED FOAMY BEER-SPURTING PHENOMENON

TECHNICAL FIELD

The present invention relates to an apparatus for preventing a beer spurting phenomenon induced by gas, and specifically to an apparatus for preventing beer spurting and generation of beer stones, which is installed on a pipe between a beer barrel and a beer drawing device to prevent gas spurting during the process of discharging from the beer barrel to the beer drawing device, and to remove and prevent beer stones from being deposited in the pipe between the beer barrel and the beer drawing device or on the inside of the beer drawing device.

BACKGROUND ART

In general, a pipe of a beer drawing device is connected to a completely sealed beer barrel and a cock valve provided in the beer drawing device is manipulated before draft beer is provided to the consumer in a beer glass. Sometimes, a cooling device is further attached to the pipe of the beer drawing device as necessary.

However, when beer in a beer barrel flows out through the beer drawing device, beer stones are deposited in the pipe or on the inside of the beer drawing device.

Such beer stones become causes of deteriorating the beer to spoil its taste and contaminating the beer. Conventionally, chemicals were injected or wash water was pressure-injected to remove the beer stones, but not only is there a decrease in the beer stone removal efficiency over time but also there is a problem that most beer stone removing chemicals should not be ingested by humans.

Meanwhile, when the beer drawing device is first opened to receive the first glass of beer after the beer barrel is connected to the beer drawing device, beer spurts out bubbling with a noise of “pung” due to carbon dioxide gas fed from the beer barrel. Such a phenomenon is called a beer spurting phenomenon induced by gas. Such a phenomenon occurs not only when the first glass of beer is filled but also when the last glass of beer is filled from the beer barrel. This is because carbon dioxide gas is discharged out of the beer drawing device together with beer remaining in the beer barrel.

Such a gas spurting phenomenon is not only very bothersome to the user but also it is not good hygienically as spurting draft beer spatters in all directions.

To prevent such a gas spurting phenomenon, the beer and carbon dioxide gas that were in the beer drawing device and the pipe should be artificially discharged, with the beer barrel and the beer drawing device being separated from each other, when exchanging the beer barrel.

However, a considerable quantity of draft beer is lost in the process of discharging the remaining beer and carbon dioxide gas, and not only much time is required for exchanging the beer barrel, but also there is a problem that the beer barrel exchange work is very cumbersome.

SUMMARY OF THE INVENTION

Problems to be Solved by the Invention

In consideration of the above-described circumstances, it is an object of the present invention to provide an apparatus which is installed on a pipe between a beer barrel and a beer drawing device to prevent gas spurting in the process of being discharged to the beer drawing device from the beer barrel.

Another object of the present invention is to provide an apparatus for preventing beer stones from being deposited or removing them, which is deposited in the pipe between the beer barrel and the beer drawing device or on the inside of the beer drawing device to deteriorate the quality of beer and spoil its taste.

Another object of the present invention is to provide an apparatus which is capable of washing with water the pipe between the beer barrel and the beer drawing device or on the inside of the beer drawing device by simple manipulation of a three-way valve, thereby reducing costs and time required for cleaning.

Means for Solving the Problems

In order to accomplish the above objects, there is provided an apparatus for preventing a beer spurting and generation of beer stones, including:

a casing 200 including a cylindrical main body 210 with a predetermined inner space formed therein, and a connecting part 220 which is formed at a lower portion of the main body 210 to control inflow and outflow of draft beer and carbon dioxide gas; and an upper cap 300 which closes an upper portion of the main body 210, wherein a connection fitting of the beer barrel 10 is connected to a lower surface of the connecting part 220, the upper cap 300 has a gas discharge pipe 340 connected thereto for discharging carbon dioxide gas, the main body 210 has a beer outflow hole 223 formed on one side thereof for discharging draft beer, the inner space 212 of the main body 210 is defined by an upper surface of the connecting part 220 and a side wall of the main body 210 to be filled with draft beer and carbon dioxide gas, the inner space 212 of the main body 210 includes a floating ball 328 floated therein, the connecting part 220 includes a first supply channel which is formed between a lower opening portion of the connecting part 220 and a first bottom hole 410 formed in the upper surface of the connecting part 220, and is configured to have draft beer and carbon dioxide gas flowed therethrough, a discharge channel which is formed between a second bottom hole 420 formed in the upper surface of the connecting part 220 and the beer outflow hole 223 for flowing out the draft beer, when draft beer is supplied to the inner space, the discharge channel is open by the floating ball 328 floating by a buoyancy of the draft beer so as to flow out the draft beer through the discharge channel, and when the inner space 212 of the main body 210 is filled with carbon dioxide gas supplied through the first supply channel, an opening of the second bottom hole 420 is closed by the floating ball 328 to block the discharge of the carbon dioxide gas.

Advantageous Effects

According to the inventive apparatus having the above-described configuration, since the apparatus is installed on the pipe between the beer barrel and the beer drawing device, it is possible to prevent the occurrence of gas spurting in the process of being discharged to the beer drawing device from the beer barrel.

In addition, according to the inventive apparatus, it is also possible to prevent beer stones from being deposited or to remove beer stones which have been deposited in the pipe between the beer barrel and the beer drawing device or on the inside of beer drawing device and which become causes of deteriorating the quality of beer to spoil its taste and contaminating beer.

Further, according to the inventive apparatus, it is also possible to prevent poor hygiene due to draft beer spurting during the exchange work of beer barrels, prevent loss of draft beer, and make it easy to exchange beer barrels by shortening the time required for exchanging beer barrels.

Further, according to the inventive apparatus, since it is possible to wash with water the pipe between the beer barrel and the beer drawing device or on the inside of the beer drawing device by simple manipulation of the three-way valve, costs and time required for cleaning may be largely reduced.

MODES FOR CARRYING OUT THE INVENTION

Hereinafter, exemplary embodiments of the present invention will be described in detail. The following embodiments are described in order to enable those of ordinary skill in the art to embody and practice the present invention. However, the present invention is not limited to the embodiments disclosed below, but can be implemented in various forms. To aid in understanding the present invention, like numbers refer to like elements throughout the description of the figures, and the description of the same elements will be not be described.

In the specification, when the explanatory phrase a part "includes" a component is used, this means that the part may further include the component without excluding other components, so long as special explanation is not given.

The apparatus for preventing beer spurting and generation of beer stones according to an embodiment of the present invention is an apparatus which is connected to a connection fitting of a beer barrel. The connection fitting refers to a coupler, and is connected to a top of the beer barrel to form an injecting pipe for injecting carbon dioxide gas and a supply pipe for supplying draft beer.

The apparatus for preventing beer spurting and generation of beer stones according to the embodiment of the present invention is an apparatus connected to the supply pipe of the connection fitting, i.e., the coupler.

Hereinafter, for the convenience of explanation, the apparatus for preventing beer spurting and generation of beer stones will be described as an apparatus connected to the connection fitting of the beer barrel.

Figure 1:
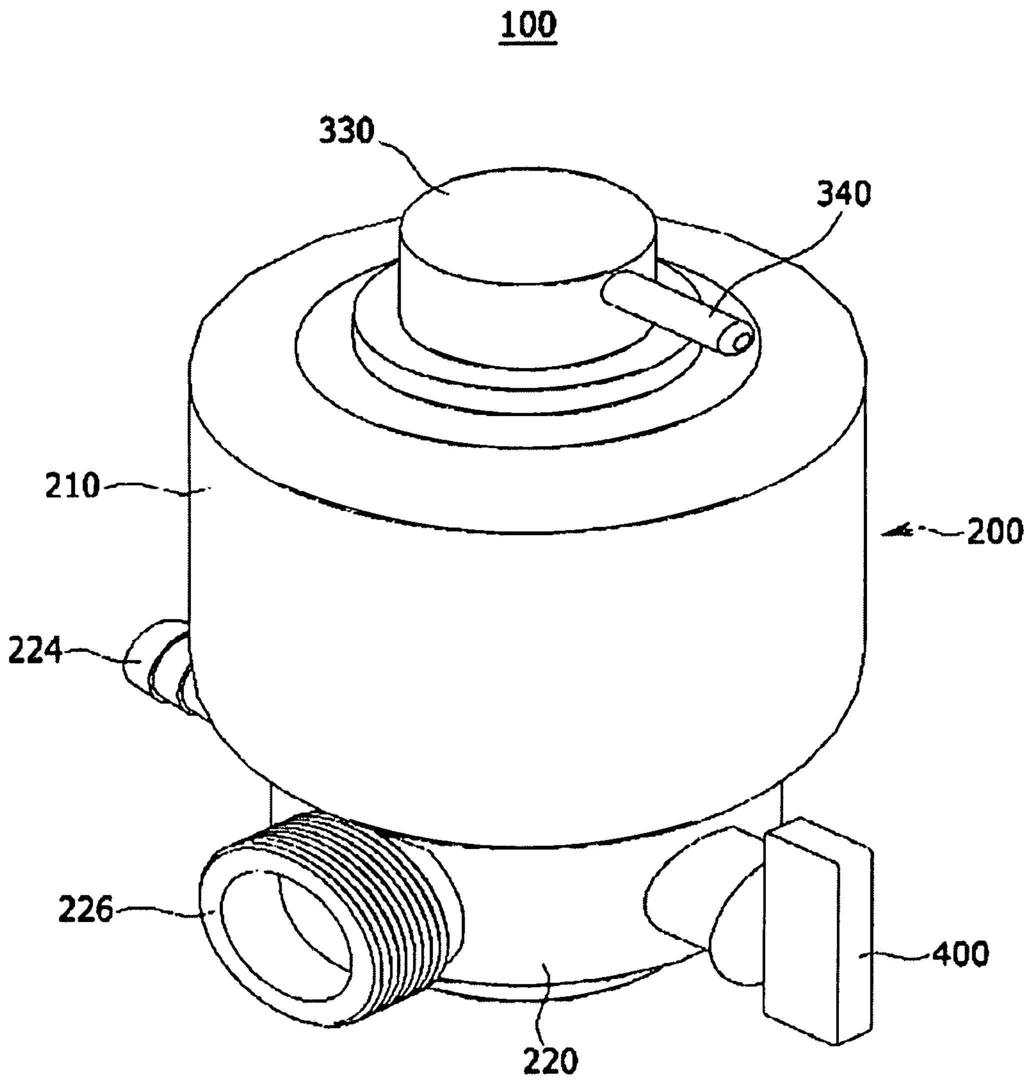
FIGS. 1 and 2 are perspective views illustrating an apparatus for preventing beer spurting and generation of beer stones according to an embodiment of the present invention.
Figure 2:
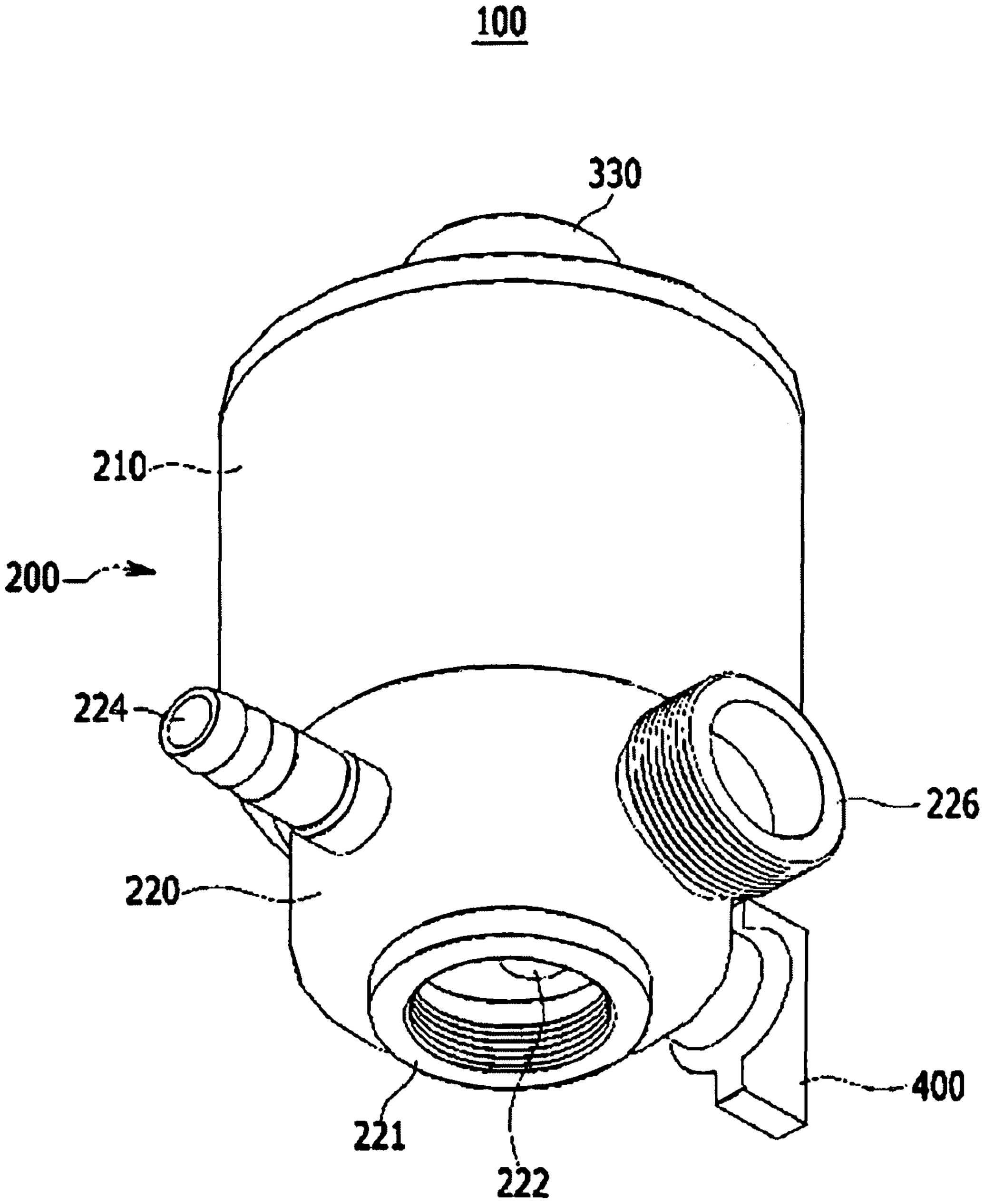
Figure 3:
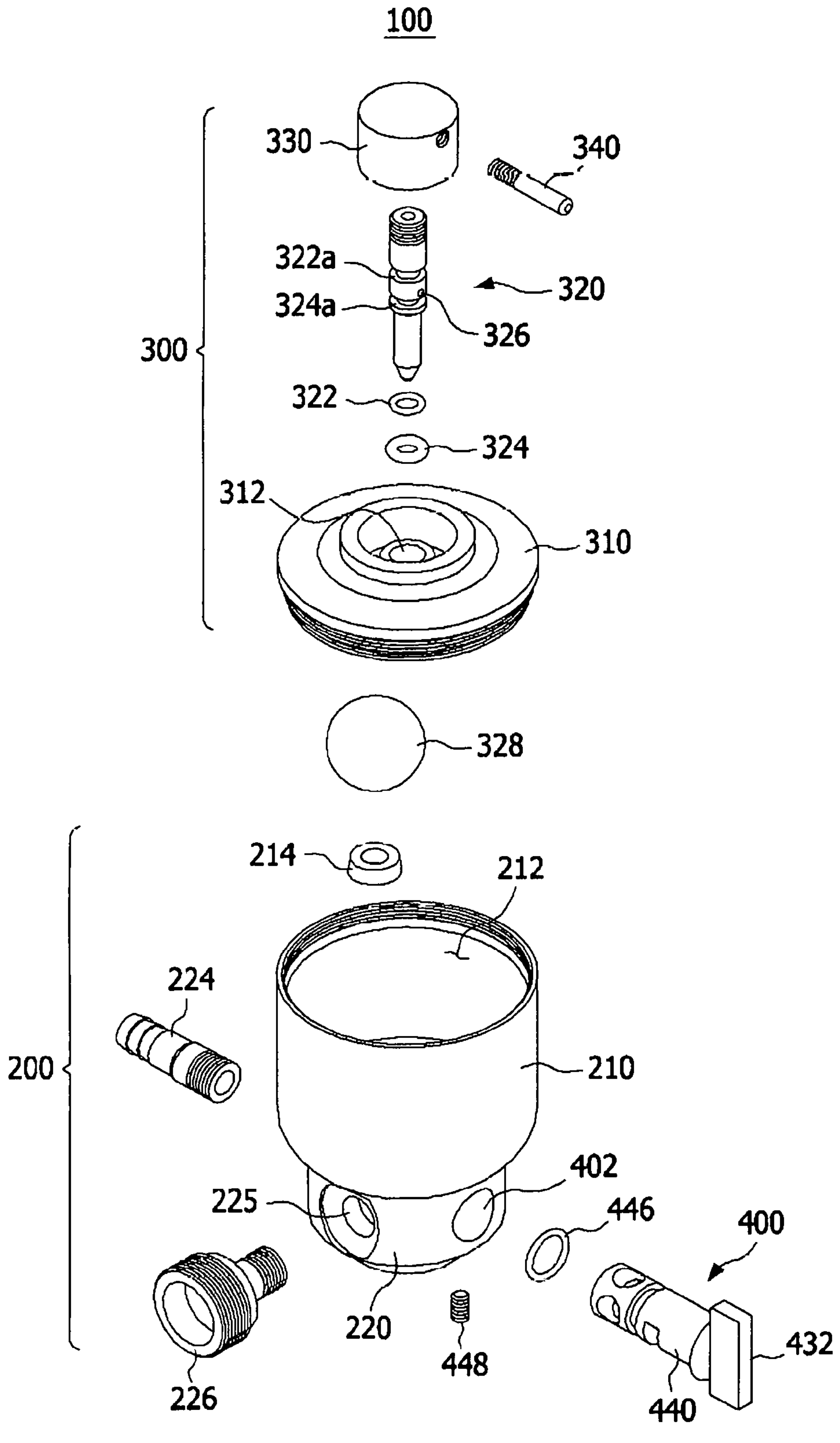
FIGS. 3 and 4 are exploded perspective views illustrating the apparatus for preventing beer spurting and generation of beer stones according to the embodiment of the present invention.
Figure 4:
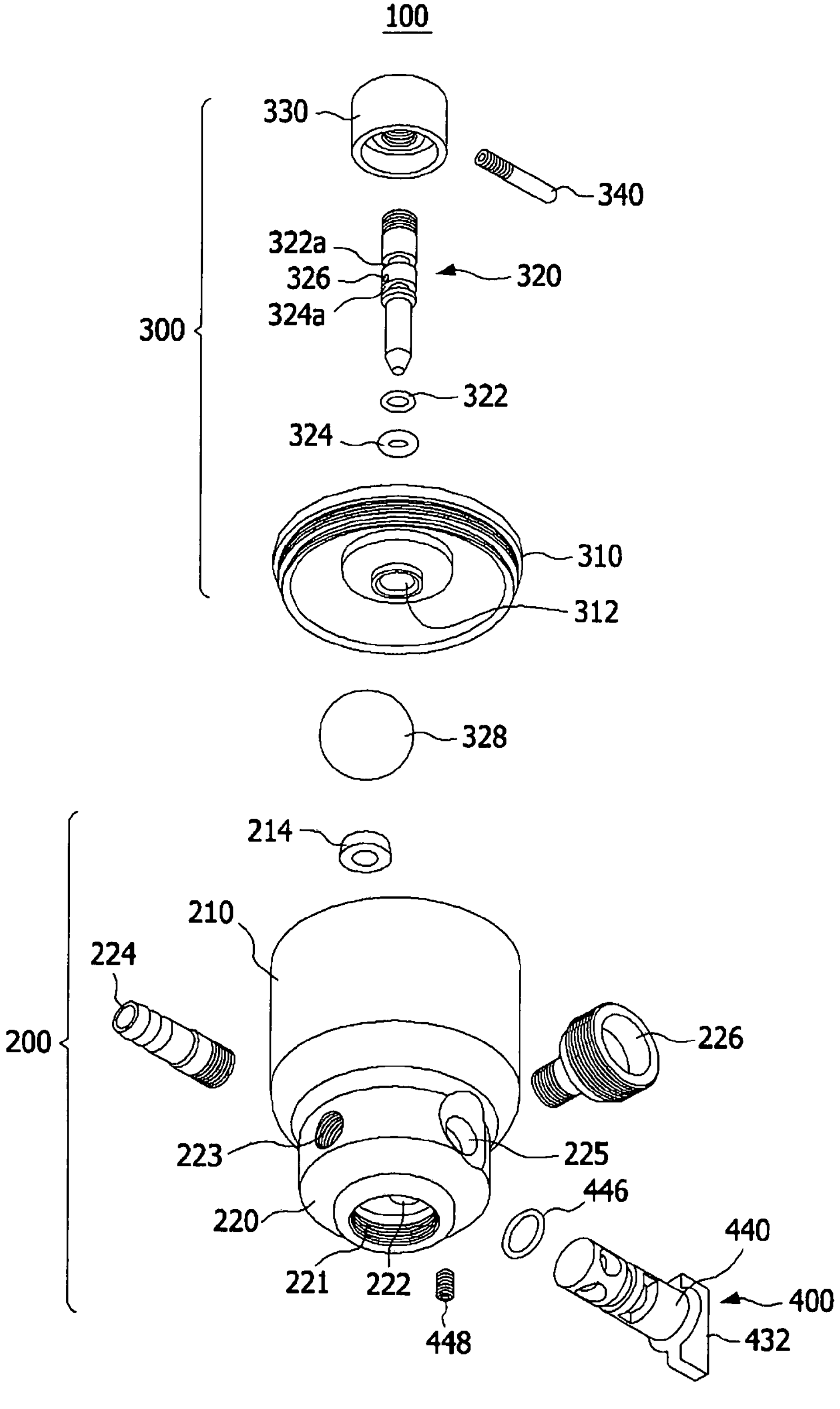
Figure 5:
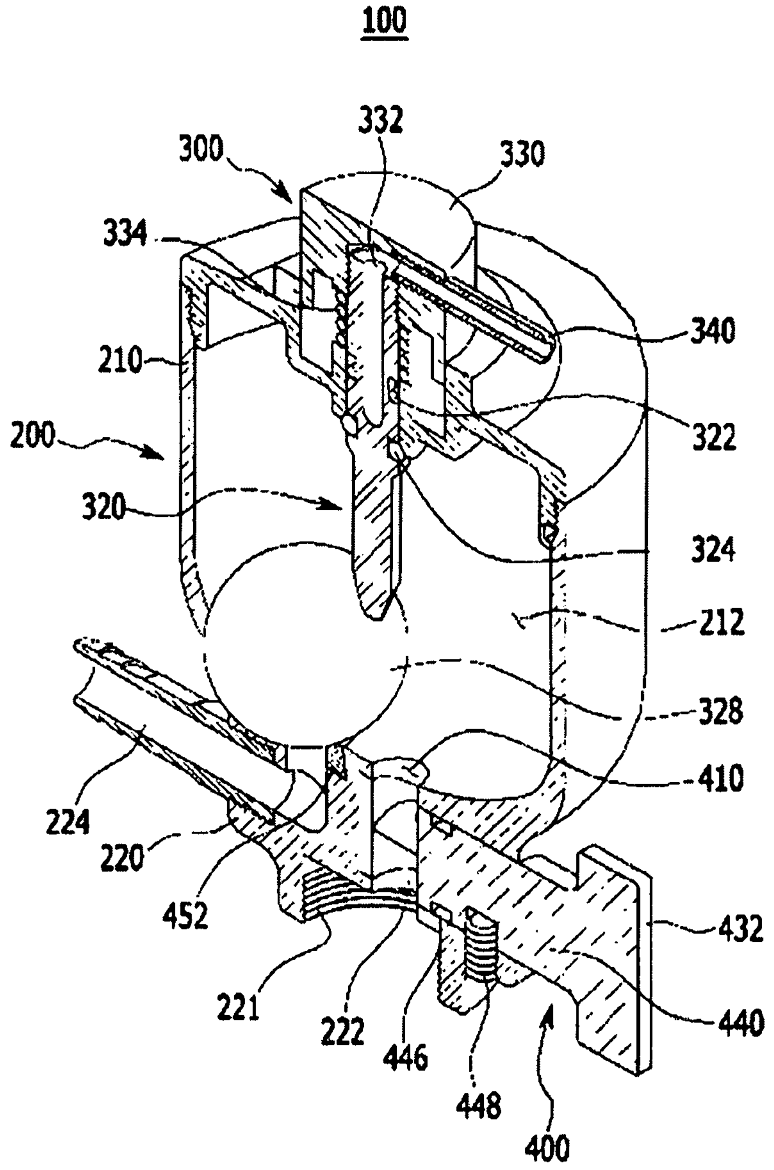
FIG. 5 is a cutaway perspective view illustrating the apparatus for preventing beer spurting and generation of beer stones according to the embodiment of the present invention.

FIGS. 1 and 2 are perspective views illustrating an apparatus for preventing beer spurting and generation of beer stones according to an embodiment of the present invention, FIGS. 3 and 4 are exploded perspective views illustrating the apparatus for preventing beer spurting and generation of beer stones according to the embodiment of the present invention, and FIG. 5 is a cutaway perspective view illustrating the apparatus for preventing beer spurting and generation of beer stones according to the embodiment of the present invention.

A beer spurting and beer stone prevention apparatus 100 according to the embodiment of the present invention includes a cylindrical shaped casing 200 having a predetermined space, and an upper cap 300 which is detachably connected to an upper portion of the casing 200.

The casing 200 includes a main body 210 provided with an inner space for containing draft beer, and a connecting part 220 which is formed at a lower portion of the main body 210 to control inflow and outflow of draft beer, carbon dioxide gas and water.

The inner space 212 of the main body 210 is defined by an upper surface of the connecting part 220 and a side wall of the main body 210. A floating ball 328 to be described below is disposed in the inner space in which draft beer, carbon dioxide gas and water are filled.

The upper surface of the connecting part 220 corresponds to a bottom of the inner space 212 of the main body 210, and a first bottom hole 410, through which draft beer, carbon dioxide gas and water flow in, and a second bottom hole 420, through which draft beer flows out, are formed therein.

In particular, the second bottom hole 420 is encircled with an O-ring 214 (not shown in FIGS. 9-12) to prevent water leakage, and is slantly and concavely formed so that the floating ball 328 blocks the inlet.

The upper cap 300 includes a circular upper plate 310 which is connected to the upper end portion of the casing 200 in a screw coupling manner.

A through hole-shaped gas outlet port 312 passing through the thickness of the upper plate 310 is formed in a central portion of the upper plate 310, and a lifting member 320 which is inserted into a penetrated gas outlet port 312.

The lifting member 320 is a circular bar member having a predetermined length, and the lower end portion is formed in a circular cone.

The lifting member 320 has an upper O-ring slot 322*a* and a lower O-ring slot 324*a* separately formed at a predetermined interval on an outer circumference in the middle upper portion thereof. An upper O-ring 322 and a lower O-ring 324 which have a circular ring shape are inserted and fixed into these slots.

The lifting member 320 is disposed upright in a vertical direction so that its lower end is close to the floating ball 328.

A gas outlet hole 326 is penetrated in the lifting member between the upper O-ring slot 322*a* and the lower O-ring slot 324*a*.

A push button 330 is connected to an upper end portion of the lifting member 320, and the push button 330 has a hollow gas discharge pipe 340 protruding in a horizontal direction therefrom.

A gas channel 332 with the lower end communicating with the gas outlet hole 326 is formed inside the lifting member 320 in a vertical direction, so that carbon dioxide gas may be discharged therethrough.

The upper end of the gas channel 332 communicates with the gas discharge pipe 340 connected to the push button 330.

A stepped portion is formed around the gas outlet port 312 on the upper surface of the upper plate 310, so that the lower end of the push button 330 is placed on the stepped portion when the push button 330 is connected.

In a ‘closed’ position at which gas is not discharged, the gas outlet hole 326 is closed by the inner peripheral surface of the upper plate 310, with the lifting member 320 positioned in the gas discharge hole 312. Therefore, carbon dioxide gas present in the inner space 212 of the main body 210 does not flow in through the gas outlet hole 326.

When the push button 330 is pressed, the lifting member 320 moves downward against a force of a spring member 334 mounted on a lower portion of the push button 330, and the outer peripheral surface formed with the gas outlet hole 326 protrudes into the inner space 212 of the main body 210.

Accordingly, the gas outlet hole 326 is exposed to the inner space 212 of the main body 210 to become in an ‘open’ position, so that carbon dioxide gas present therein flows through the gas outlet hole 326.

The flowing carbon dioxide gas passes through the gas channel 332 communicating with the gas outlet hole 326, and is discharged from the gas discharge pipe 340.

If the force pressing the push button 330 is removed, the push button 330 is moved again upward by an elastic restoring force of the spring member 334 to return to the original position thereof, so that the lifting member 320 ascends again so as to be inserted in the gas outlet port 312.

Further, the gas outlet hole 326 is closed by the inner peripheral surface of the gas outlet port 312 to become in the ‘closed’ position at which carbon dioxide gas does not flow therethrough.

The gas discharge structure using the push button 330 as described above is one example of a gas discharge valve, and it is not limited to such a configuration and may be configured by modifying in various ways.

The connecting part 220 has a connecting hole 221 which is formed in the lower surface thereof to be connected with the connection fitting of the beer barrel, and a beer inflow hole 222 which is vertically penetrated in the center thereof so that draft beer flows in the inner space from the connecting hole 221.

A beer outflow hole 223 through which draft beer flows out is horizontally penetrated in one side of the connecting part 220. A beer pipe connector 224 which is connected with a beer drawing device (not shown) is coupled to the beer outflow hole 223.

A water inflow hole 225 through which water flows in is penetrated in the side wall of the connecting part 220 positioned in a direction substantially orthogonal to the beer outflow hole 223. A water pipe connector 226 which is connected to a feed hose of a water tank is coupled to the water inflow hole 225.

The beer pipe connector 224 and the water pipe connector are annular members, and are provided integrally with the main body 210 by screwing.

A valve slot 402 to which a flow changing valve 400 is coupled is penetrated in the side wall of the connecting part 220 which is positioned in a direction substantially orthogonal to the water inflow hole 225 and in a direction substantially coaxially with the beer outflow hole 223. The flow changing valve 400 coupled to the valve slot 402 plays a role of changing the inflow of water and draft beer.

The connecting part 220 includes a first supply channel formed between the first bottom hole 410 formed in the upper surface of the connecting part 220 and a lower opening portion of the beer inflow hole 222 which is vertically formed in the connecting part 220 for communicating therewith. Draft beer and carbon dioxide gas flow in the first supply channel.

Herein, the upper surface of the connecting part 220 corresponds to the bottom of the inner space 212 of the main body 210, and the bottom surface of the connecting part 220 corresponds to the lower surface of the casing 200 as a whole.

The connecting part 220 is also provided with a discharge channel formed in parallel with the first supply channel. The discharge channel is formed between the second bottom hole 420 of the upper surface of the connecting part 220 and the beer outflow hole 223 formed in the side wall of the connecting part 220 for communicating therewith inside of the connecting part 220, while being bent in the middle thereof.

An inlet of the discharge channel is formed on the upper surface of the connecting part 220 to communicate with the inner space, while an outlet of the discharge channel communicates with the beer pipe connector 224 which is connected to the beer outflow hole 223 formed in the side wall of the connecting part 220.

An inlet of a second supply channel (water inflow hole 225) for supplying water is formed in the side wall of the connecting part 220 positioned in a direction orthogonal to the beer outflow hole 223.

The second supply channel extends from the water inflow hole 225 formed in the side wall of the connecting part 220 to the inside of the connecting part 220, and penetrates to the first bottom hole 410. The second supply channel starts from the side wall of the connecting part 220 and communicates with the first supply channel. The first supply channel and the second supply channel selectively communicate with each other inside of the connecting part 220 in an orthogonal direction.

When the floating ball 328 is maintained in a state in which the second bottom hole 420 is continuously closed by the floating ball 328 due to the pressure difference even though new draft beer flows in through the first supply channel from the beer barrel, it is necessary to move the floating ball 328 a little so that it can be floated by the pressure of draft beer.

If the push button 330 is pressed for this purpose, the lifting member 320 moves downward against the force of the spring member 334 mounted on the lower portion of the push button 330 to press the floating ball 328 so as to move it.

If the force pressing the push button 330 is removed, the push button 330 moves upward again by the elastic restoring force of the spring member 334 to return to the original position thereof, so that the lifting member 320 moves upward from the inner space 212 of the main body 210.

The flow changing valve 400 includes an operating rod 440 which is inserted into the valve slot 402 extending inward from the side wall of the connecting part 220, and a lever 432 which is connected to the operating rod 440 to pivot the operating rod 440.

Figure 6:
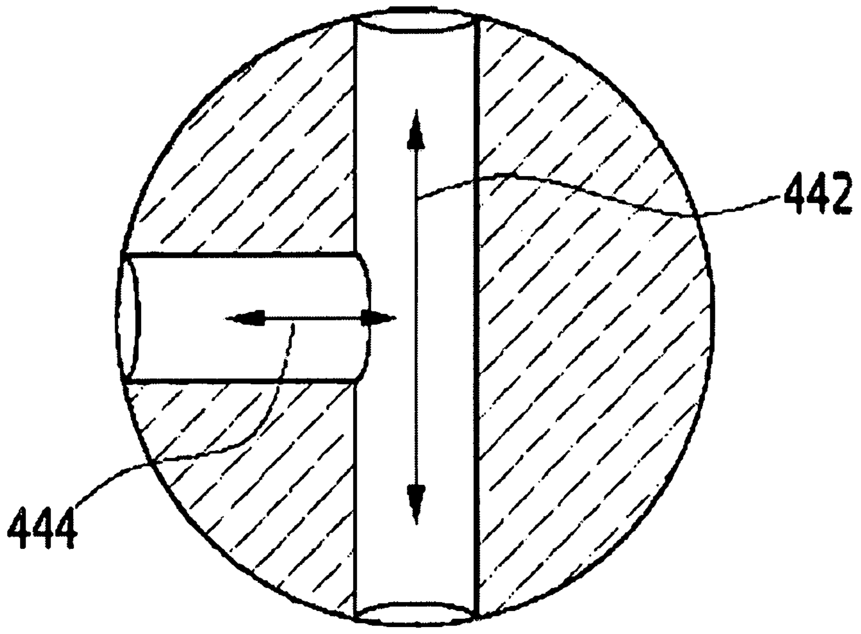
FIG. 6 is a cross-sectional view illustrating passages of a three-way valve according to the embodiment of the present invention.

As illustrated in FIG. 6, the operating rod 440 includes a first passage 442 which penetrates the thickness of the operating rod 440 to form the first supply channel penetrating between the upper surface and the lower surface of the connecting part 220, and a second passage 444 which penetrates the operating rod in a direction orthogonal to the first passage 442 to form the second supply channel.

Herein, the first passage 442 supplies draft beer or carbon dioxide gas by opening the first supply channel and closing the second supply channel, and the second passage 444 supplies water by closing the first supply channel and opening the second supply channel.

The operating rod 440 is provided with a stopper 448 protruding from one side thereof for limiting the pivot range thereof so as not to exceed 90 degrees during the direction change of the lever 432.

A packing 446 is closely installed between the first and second passages 442 and 444 and the stopper 448 on the operating rod 440 so as to prevent beer or water leakage.

Figure 7:
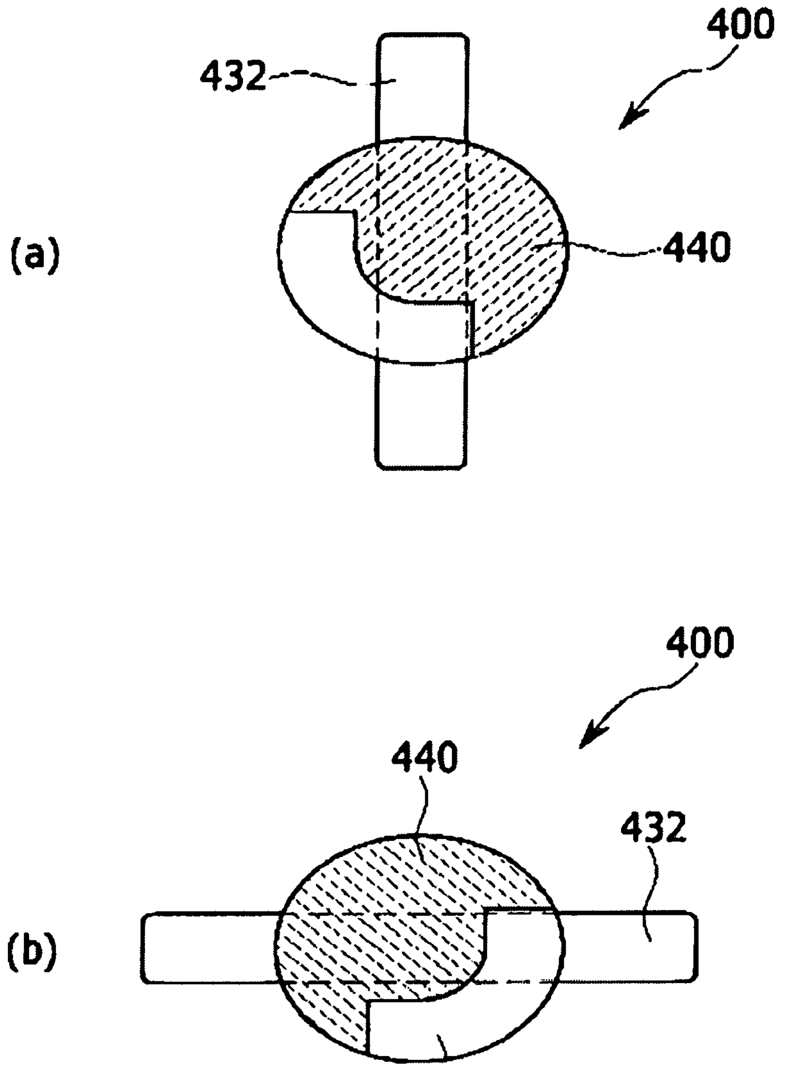
FIG. 7 is cross-sectional views illustrating operation states of the three-way valve according to the embodiment of the present invention.

In the operating rod 440, as illustrated in FIG. 7, if the lever 432 is pivoted, the first passage 442 is open and the second passage 444 is closed, and if the direction of the lever 432 is changed by 90 degrees, the first passage 442 is closed and the second passage 444 is open.

Figure 8:
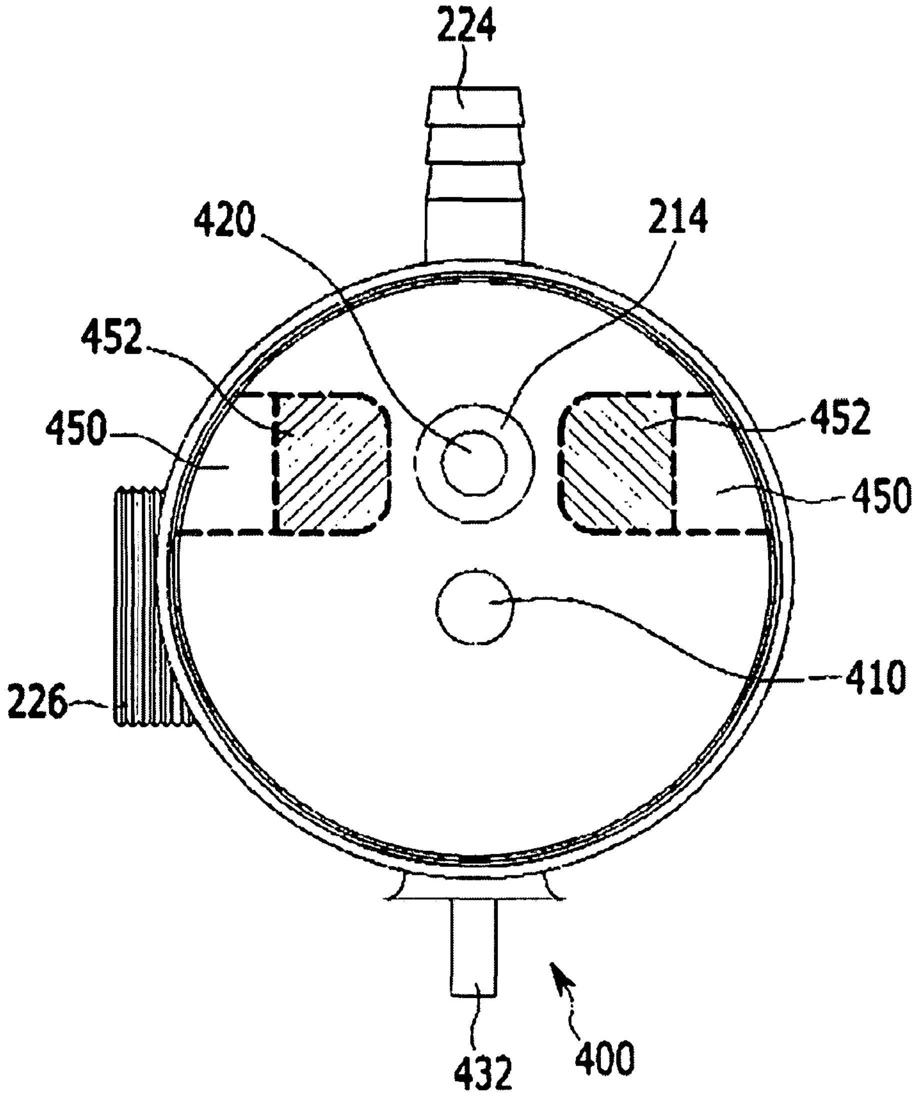
FIG. 8 is a horizontal sectional view illustrating the apparatus for preventing beer spurting and generation of beer stones according to the embodiment of the present invention.

The connecting part 220 is, as illustrated in FIG. 8, provided with the second bottom hole 420 and concave parts 450 respectively formed on both sides of the discharge channel. Magnets 452 are installed in each of the concave parts 450. Further, the concave parts 450 may be formed in a large scale in the connecting part 220, so as to install the magnets 452 across the discharge channel and both sides of the first supply channel.

Next, an operation and effects of the beer spurting and beer stone prevention apparatus 100 according to the embodiment of the present invention having the above-described configuration will be described with reference to FIGS. 9 and 10.

Figure 9:
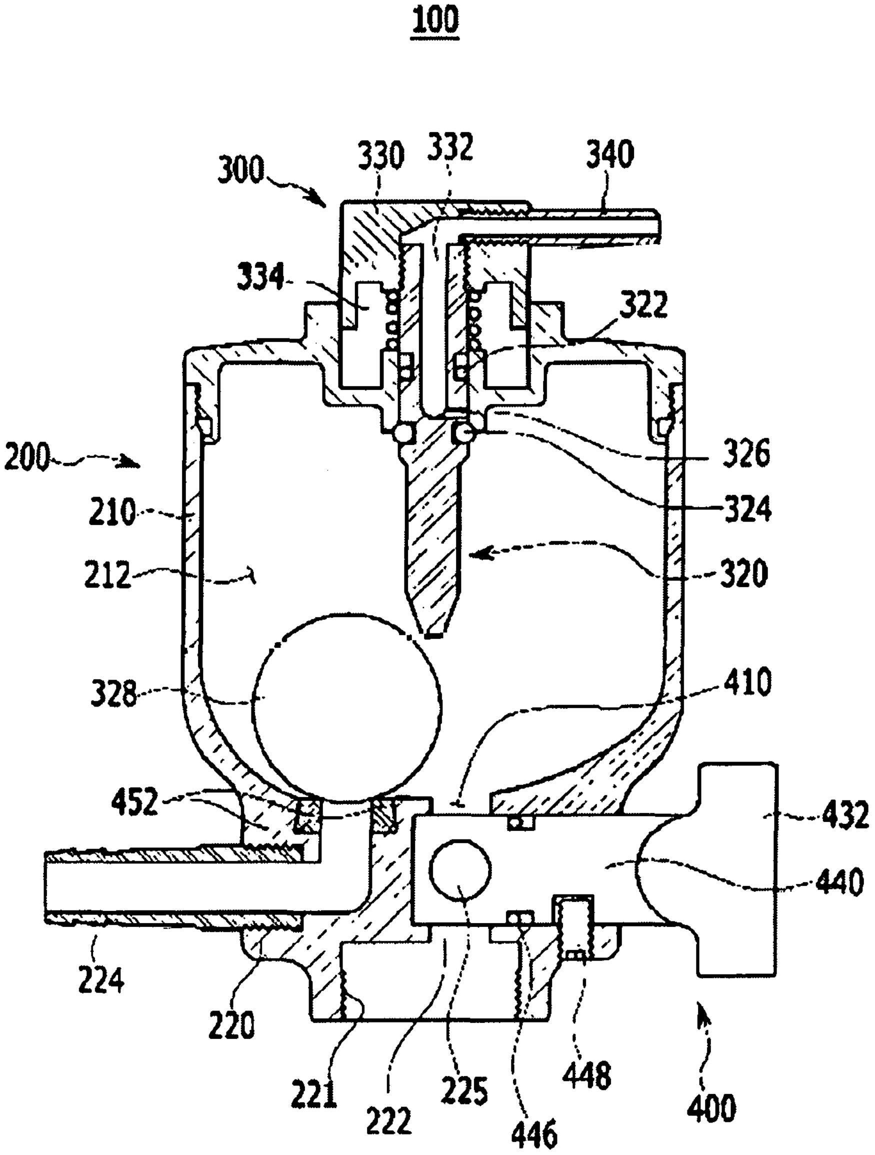
FIG. 9 is a vertical sectional view illustrating the apparatus for preventing beer spurting and generation of beer stones according to the embodiment of the present invention.
Figure 10:
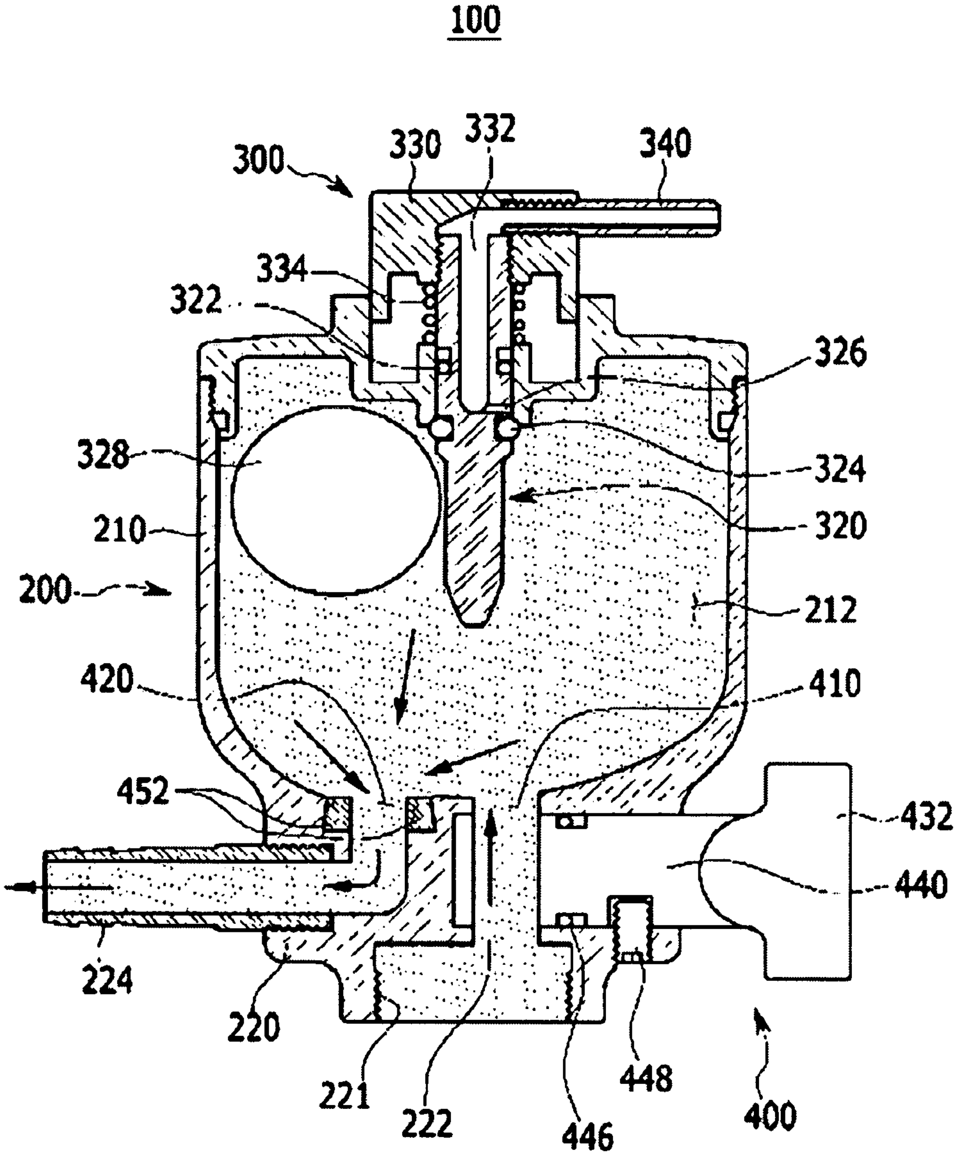
FIG. 10 is a vertical sectional view illustrating the apparatus for preventing beer spurting and generation of beer stones according to the embodiment of the present invention, in which draft beer is introduced into an inner space of a main body thereof.

FIG. 9 is a vertical sectional view illustrating the apparatus for preventing beer spurting and generation of beer stones according to the embodiment of the present invention, and FIG. 10 is a vertical sectional view illustrating the apparatus for preventing beer spurting and generation of beer stones according to the embodiment of the present invention, in which draft beer is introduced into an inner space of a main body thereof.

First, the beer spurting and beer stone prevention apparatus 100 operates the flow changing valve 400 so as to open the first passage 442, which is the beer supply channel, and closes the second passage 444, which is the water supply channel.

In the beer spurting and beer stone prevention apparatus 100, draft beer flows into a beer inflow hole 222 of a connecting hole 221 through the connection fitting from the beer barrel.

Draft beer flows into the inner space 212 of the main body 210 through the first supply channel from the beer inflow hole 222.

The flowing draft beer fills the inner space 212 of the main body 210, and thereby the floating ball 328 is floated by the pressure of draft beer.

Accordingly, the second bottom hole 420 of the bottom of the main body 210 (that is, the inlet of the discharge channel) is kept open.

The flowing draft beer enters into the second bottom hole 420 and flows out through the beer outflow hole 223 (that is, the outlet of the discharge channel) formed in the side wall of the main body 210, and is fed to the beer drawing device through the beer pipe connector 224 connected to one end thereof.

Metallic cations such as minerals are dissolved in draft beer. A negative charge of the static electricity generated during the draft beer passing through the first supply channel and discharge channel is attracted around the metallic cations, so that an ionized layer of negative electric charge is formed around the metallic cation.

The metallic cation with an ionized layer of negative electric charge formed thereon bonds with a calcium ion or magnesium ion that induces beer stones to form a cohesive ion carrier.

Such an ion carrier is minimally attracted to the duct.

Namely, it is possible to prevent generation of beer stones which are formed as calcium ions, etc. stick to the duct.

Draft beer enters into the second bottom hole 420 and flows out through the beer outflow hole 223 (that is, the outlet of the discharge channel) formed in the side wall of the main body 210, and is fed to the beer drawing device connected to one end thereof through the beer pipe connector 224.

As the draft beer passes through the beer outflow hole 223 from the second bottom hole 420, strong magnetic fields from a magnet 452 positioned in the concave part 450 are applied thereto.

If the magnetic fields are applied to draft beer as described above, a magnetic resonance phenomenon, in which oscillation and air gaps are generated between water molecules, may occur. Accordingly, energy is generated due to vigorous motions and many collisions between water molecules of draft beer.

Through such energy, water contained in draft beer becomes ionic water with plentiful amounts of hydrogen ions ($H^+$) and hydroxide ions ($OH^-$).

Hydroxide ions cause calcium ions, etc., which are substances causing beer stones on the interface such as the wall surface of the duct, to lose electric charge, so that calcium, etc. does not stick to the wall surface of the pipe but is transformed into solid particles, and thereby generation of beer stones is prevented.

Meanwhile, as the draft beer passes through the first supply channel and the discharge channel which have a narrow diameter, the bubbles of carbon dioxide gas contained in draft beer are changed into bubbles with a finer size.

The beer stones which are deposited in the pipe, etc. easily fall off due to the effect of the fine bubbles of carbon dioxide gas, and a water flow occurring as the draft beer is continuously fed and flows in the pipe hits and removes the beer stones.

As the draft beer is pushed upward in a pressed condition through the narrow diameter of the discharge channel, a resonance phenomenon, in which oscillation and air gaps occur between the water molecules of beer, is produced by the magnetic field wave motion of a permanent magnet 452. At the same time, since it is possible to make soft beer with minute particulate structures made by increasing the fineness of the water molecules of beer, deterioration of draft beer taste may be prevented.

The beer spurting and beer stone prevention apparatus 100 may prevent beer stones from being deposited, by discharging out together with beer the beer stone substances dissolved in beer by means of the static electricity generated while the draft beer passes through the narrow diameter of the first supply channel and the discharge channel at high pressure and the magnetic fields from the permanent magnet 452. Further, it has an effect of removing already generated beer stones, and keeping the beer line clean in a manner in which antimicrobial and germicidal actions of hydrolytic ions ensure that harmful byproducts are not produced.

Next, a case in which the beer barrels should be exchanged as bubbles and carbon dioxide gas only are fed from the beer barrel after draft beer contained in the beer barrel has been exhausted will be described with reference to FIG. 11.

Figure 11:
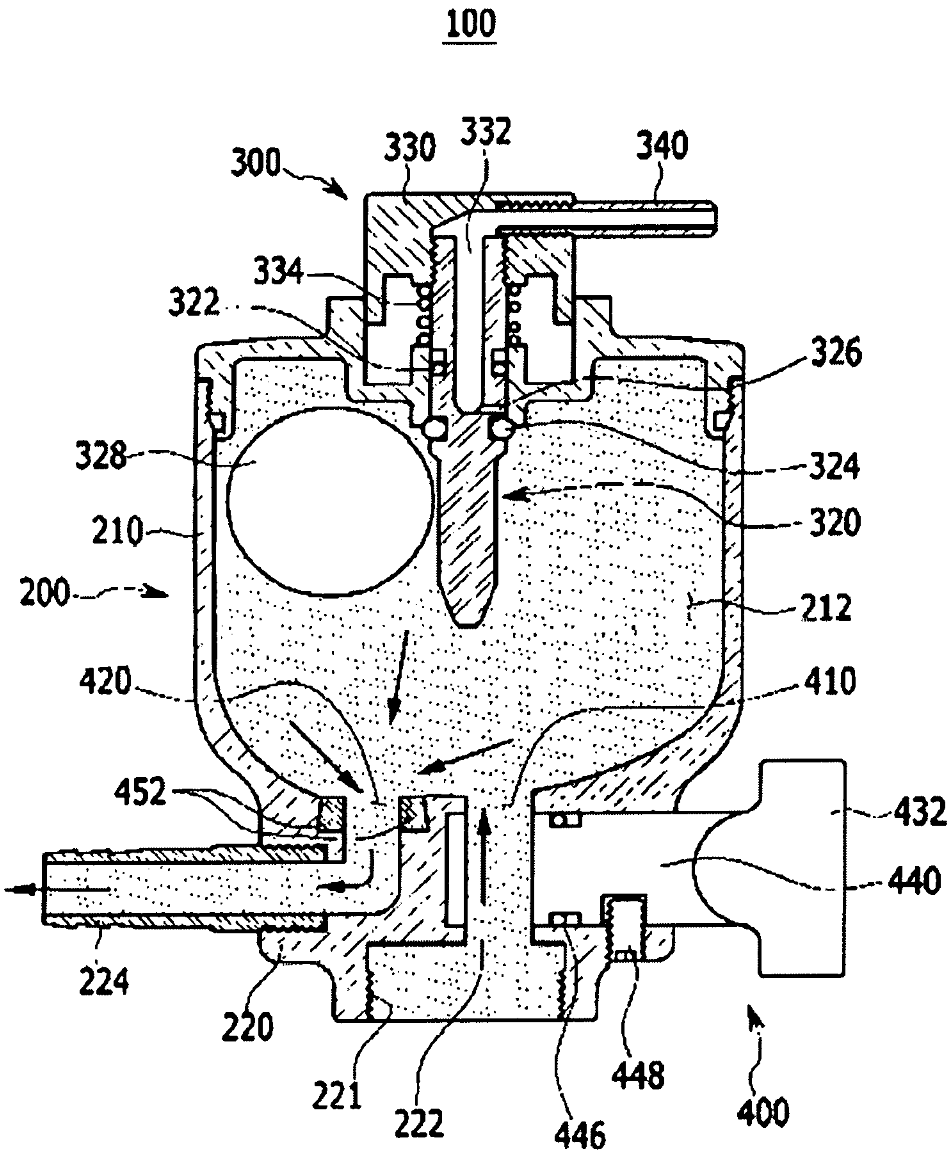
FIG. 11 is a vertical sectional view illustrating the apparatus for preventing beer spurting and generation of beer stones according to the embodiment of the present invention, in which carbon dioxide gas is discharged therefrom.

FIG. 11 is a vertical sectional view illustrating the apparatus for preventing beer spurting and generation of beer stones according to the embodiment of the present invention, in which carbon dioxide gas is discharged therefrom.

First, the beer spurting and beer stone prevention apparatus 100 operates the flow changing valve 400 to open the first passage 442, which is the beer supply channel, and close the second passage 444, which is the water supply channel.

Conventionally, the gas spurting phenomenon occurs as bubbles and carbon dioxide gas are fed into the beer drawing device because the draft beer of the beer barrel has been exhausted.

In the case of the beer spurting and beer stone prevention apparatus 100 of the present invention, draft beer flows from the beer barrel into the beer inflow hole 222 of the connecting hole 221 through the connection fitting.

The bubbles and carbon dioxide gas flowing from the beer barrel flows into the inner space 212 of the main body 210 through the first supply channel via the beer inflow hole 222 of the connecting hole 221.

Carbon dioxide gas is filled from the upper portion of the inner space 212 of the main body 210, and the draft beer remaining in the inner space 212 of the main body 210 flows out through the beer outflow hole 223 via the second bottom hole 420.

The floating ball 328 floating in the draft beer is laid on the concavely formed second bottom hole 420 (the inlet of the discharge channel) of the main body 210 to close the second bottom hole 420 by the pressure of carbon dioxide gas.

If the beer drawing device is open in the above-described state, negative (−) pressure is generated inside the discharge channel toward the beer drawing device, so that the floating ball 328 comes into contact with the second bottom hole 420, and thereby the discharge channel is completely blocked.

Thus, when the beer spurting and beer stone prevention apparatus 100 of the present invention becomes a state in which draft beer in the beer barrel is exhausted so only bubbles and carbon dioxide gas are fed from the beer barrel, the floating ball 328 is moved by the pressure of the carbon dioxide gas filled in the inner space 212 of the main body 210, so as to automatically block the second bottom hole 420, which is the inlet of the discharge channel.

Therefore, even if the beer drawing device is open, occurrence of the gas spurting phenomenon due to discharge of carbon dioxide gas can be prevented.

According to the present invention, since the problem of bubbles, etc. spurting and spattering in all directions is prevented, a clean sanitary condition may be maintained as well as it does not provide unnecessary difficulty to the user.

Further, the user does not experience a gas spurting phenomenon and can easily know the time to exchange beer barrels by confirming that draft beer does not come out any longer by opening the beer drawing device.

If the second bottom hole 420 (the inlet of the discharge channel) is closed by the floating ball 328, the carbon dioxide gas filled in the inner space 212 of the main body 210 should be discharged before replacing the empty beer barrel with a new beer barrel.

For this purpose, if the user presses the push button 330, the lifting member 320 moves downward against the force of the spring member 334 mounted on the lower portion of the push button 330.

Thereby, the outer peripheral surface at the bottom end of the lifting member 320 formed with the gas outlet hole 326 protrudes from the lower end of the gas outlet port 312, and the gas outlet hole 326 is exposed to the inner space 212 of the main body 210, so that carbon dioxide gas flows into the gas outlet hole 326.

The flowing carbon dioxide gas flows to the gas discharge pipe 340 along the gas channel 332 communicating with the gas outlet hole 326 to be discharged to an outside.

If the push button 330 is slightly pressed, the upper O-ring 322 plays a role of an obstacle by rolling action in the upper O-ring slot **322*a*, so that the lifting member 320** moves downward about 2 mm.

The gas outlet hole 326 is exposed to the inner space 212 of the main body 210 by the lowered push button 330 without contacting the floating ball 328. That is, it provides a function of discharging the carbon dioxide gas filled at the top end of the inner space 212 of the main body 210.

When carbon dioxide gas is completely discharged, the force pressing the push button 330 is removed. Thereby, the push button 330 moves upward by the elastic restoring force of the spring member 334, and the lifting member 320 also moves up to return to the original position thereof. Thereby, the gas outlet hole 326 is closed by the inner peripheral surface of the upper plate 310 while being inserted in the gas outlet port 312.

Thus, the beer spurting and beer stone prevention apparatus 100 has the empty beer barrel replaced with a new beer barrel after gas is completely discharged, and one end of the connection fitting is connected to a new beer barrel and the other end of the connection fitting is connected to the connecting hole 221 of the connecting part 220, then draft beer flows again from the new beer barrel.

The flowing draft beer flows into the inner space 212 of the main body 210 through the first bottom hole 410 of the bottom of the main body 210 via the beer inflow hole 222 (the first supply channel).

The flowing draft beer fills the inner space 212 of the main body 210, and thereby the floating ball 328 is floated again by the pressure of draft beer, and opens the second bottom hole 420 (that is, the inlet of the discharge channel) on the bottom of the main body 210 so as to discharge through the beer outflow hole 223 (that is, the outlet of the discharge channel) formed in the side wall of the main body 210, and then is fed from the beer pipe connector 224 to the beer drawing device (discharge channel) via the pipe connected thereto.

At this time, the floating ball 328 moves by the buoyancy due to the draft beer as it is being filled and opens the second bottom hole 420. Therefore, the inlet of the discharge channel is open, with the upper portion of the inner space 212 of the main body 210 filled with the draft beer instead of the carbonic acid gas.

However, in the present invention, since negative pressure is generated from the beer drawing device so that the floating ball 328 is pressed to the second bottom hole 420 to maintain a tightly contacted state, a situation in which the floating ball 328 is not floated by the pressure of draft beer flowing into the inner space 212 of the main body 210 may occur.

To solve such a problem, if the push button 330 is strongly pressed the lifting member 320 moves downward against the force of the spring member 334 mounted on the lower portion of the push button 330, so that the bottom end portion of the lifting member 320 pushes the floating ball 328 to move it.

If the second bottom hole 420 is open even a little by the movement of the floating ball 328, draft beer flows out to the discharge channel through the second bottom hole 420 and the negative pressure does not act on the floating ball 328. Accordingly, a pulling force is not applied to the floating ball 328, so as to be floated due to the buoyancy of the draft beer.

In the beer spurting and beer stone prevention apparatus 100 of the present invention, the floating ball 328 moves to open the discharge channel, with the upper end portion of the inner space 212 of the main body 210 filled with the draft beer instead of the carbon dioxide gas.

Accordingly, the discharge channel becomes a state in which carbon dioxide gas does not flow in but only draft beer flows in, and when receiving the first glass of draft beer from the beer drawing device after exchanging for a new beer barrel, the gas spurting phenomenon in which carbon dioxide gas is abruptly discharged does not occur but draft beer is discharged right away.

Thus, the beer spurting and beer stone prevention apparatus 100 of the present invention may effectively prevent the gas spurting phenomenon, thereby it is possible to solve the problems of poor hygiene, and user difficulty, etc., and further a considerable amount of beer loss during exchange of beer barrels may be prevented.

Further, the beer spurting and beer stone prevention apparatus 100 of the present invention has an effect that the work of exchanging beer barrels may be done easily and quickly.

Next, an operation of cleaning beer stones or foreign substances in the pipe by injecting pressured water will be described with reference to FIG. 12.

Figure 12:
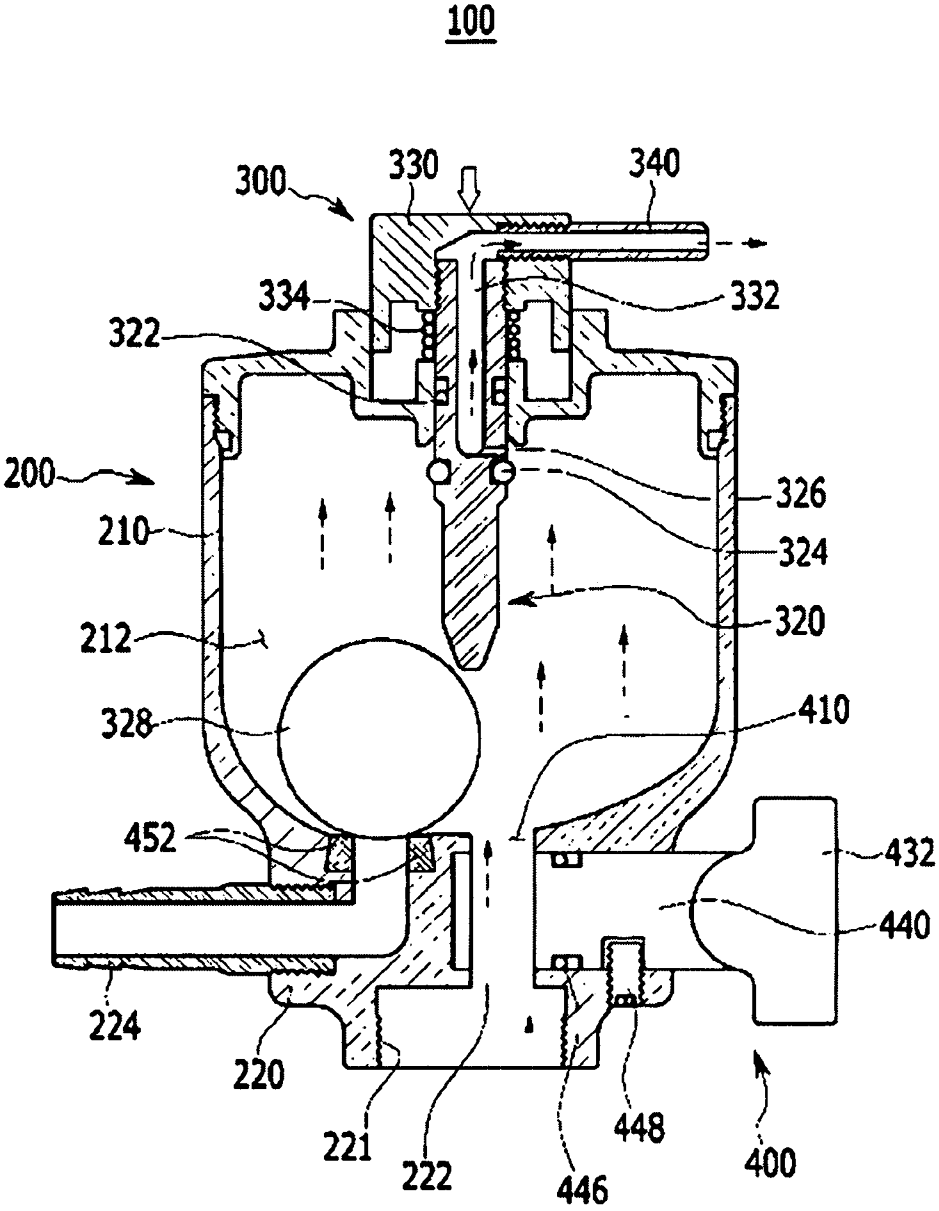
FIG. 12 is a vertical sectional view illustrating the apparatus for preventing beer spurting and generation of beer stones according to the embodiment of the present invention, in which water is supplied therein.

FIG. 12 is a vertical sectional view illustrating the apparatus for preventing beer spurting and the generation of beer stones according to the embodiment of the present invention, in which water is supplied therein.

First, the beer spurting and beer stone prevention apparatus 100 operates the flow changing valve 400 to close the first passage 442, which is a beer supply channel, and open the second passage 444, which is a water supply channel.

Accordingly, in the beer spurting and beer stone prevention apparatus 100, water flows into the water inflow hole 225 through the water pipe connector 226 from a water supply unit (not shown).

The supplied water flows into the first bottom hole 410 from the water inflow hole 225 via the second passage 444 (the second supply channel), and flows out through the beer outflow hole 223 (that is, the outlet of the discharge channel) formed in the side wall of the main body 210 through the second bottom hole 420 in the inner space 212 of the main body 210, and is fed to the beer drawing device through the beer pipe connector 224 via the pipe connected thereto (discharge channel).

Such pressure-injected water quickly flows to the second supply channel, the pipe and the beer drawing device through the beer spurting and beer stone prevention apparatus 100 to clean away foreign substances such as beer stones.

The beer spurting and beer stone prevention apparatus 100 of the present invention may clean the pipe and the beer drawing device without separating the beer barrel, thereby it is possible improve cleaning workability and largely reduce costs and time required for cleaning.

The embodiment of the present invention described above may not be implemented only through the apparatus and method as described, but can be implemented also through programs for realizing the function corresponding to the configuration of the embodiment of the present invention, recording media in which the program is recorded, etc., and such implementation can be easily made from the description of the above described embodiment by a person who has common knowledge in the technical field to which the present invention pertains.

While the present invention has been described with reference to the preferred embodiments, the present invention is not limited to the above-described embodiments, and it will be understood by those skilled in the related art that various modifications and variations may be made therein without departing from the scope of the present invention as defined by the appended claims.

INDUSTRIAL APPLICABILITY

According to the inventive apparatus having the above-described configuration, since the apparatus is installed on the pipe between the beer barrel and the beer drawing device, it is possible to prevent the occurrence of gas spurting in the process of being discharged to the beer drawing device from the beer barrel.

In addition, according to the inventive apparatus, it is also possible to prevent beer stones from being deposited or to remove beer stones which have been deposited in the pipe between the beer barrel and the beer drawing device or on the inside of beer drawing device and which become causes of deteriorating the quality of beer to spoil its taste and contaminating beer.

Further, according to the inventive apparatus, it is also possible to prevent poor hygiene due to draft beer spurting during the exchange work of beer barrels, prevent loss of draft beer, and make it easy to exchange beer barrels by shortening the time required for exchanging beer barrels.

Further, according to the inventive apparatus, since it is possible to wash with water the pipe between the beer barrel and the beer drawing device or on the inside of the beer drawing device by simple manipulation of the three-way valve, costs and time required for cleaning may be largely reduced.

The invention claimed is:

1. An apparatus for preventing a beer spurting and generation of beer stones, the apparatus comprising:

a casing (200) including a cylindrical main body (210) with a predetermined inner space formed in the casing (200), a connecting part (220) that is formed at a lower portion of the main body (210) to control inflow and outflow of draft beer and carbon dioxide gas; and an upper cap (300) that closes an upper portion of the main body (210), wherein a connection fitting of a beer barrel is directly threadably connected to a lower threaded surface of the connecting part (220), the upper cap (300) comprising a gas discharge pipe (340) connected to the upper cap (300) for discharging carbon dioxide gas, wherein the upper cap (300) includes: an upper plate (310) formed with a through hole-shaped gas outlet port (312) comprising a central portion is open; and a lifting member (320) that is inserted into the penetrated gas outlet port (312) while being upright in a vertical direction, the main body (210) has a beer outflow hole (223) formed on one side for discharging the draft beer, an inner space (212) of the main body (210) is defined by an upper surface of the connecting part (220) and a side wall of the main body (210) to be filled with the draft beer and carbon dioxide gas, the inner space (212) of the main body (210) includes a floating ball (328), the connecting part (220) includes a first supply channel that is formed between a lower opening portion of the connecting part (220) and a first bottom hole (410) formed in the upper surface of the connecting part (220), and is configured to have the draft beer and carbon dioxide gas flow through the first supply channel, a discharge channel that is formed between a second bottom hole (420) formed in the upper surface of the connecting part (220) and the beer outflow hole (223) for flowing out the draft beer, when the draft beer is supplied to the inner space, the discharge channel is opened by the floating ball (328) floating by a buoyancy of the draft beer so that the draft beer flows out through the discharge channel, and when the inner space (212) of the main body (210) is filled with carbon dioxide gas supplied through the first supply channel, an opening of the second bottom hole (420) is closed by the floating ball (328) to block the discharge of the carbon dioxide gas, wherein a push button (330) is connected to an upper end portion of the lifting member (320) to be exposed to an outside, and the lifting member (320) vertically moves depending on an operation of the push button (330) to press and move the floating ball (328) from the second bottom hole (420).

2. The apparatus according to claim 1, wherein a water inflow hole (225), in which water flows, is formed in a side wall of the connecting part (220), the connecting part (220) including a second supply channel that is formed between the water inflow hole (225) formed in the sidewall of the connecting part (220) and the first bottom hole (410) of the connecting part (220), and is configured to have water flow through the second supply channel.

3. The apparatus according to claim 2, further comprising a flow changing valve (400) that is inserted in the connecting part (220) from a side of the connecting part (220) to an inside of the connecting part (220) to change a flow direction between the first supply channel and the second supply channel, wherein depending on an operation of the flow changing valve (400), the first supply channel is open and the second supply channel is closed to supply the draft beer or the carbon dioxide gas, and the first supply channel is closed and the second supply channel is open to supply water.

4. The apparatus according to claim 1, wherein magnets (452) are installed in an inner region of the connecting part (220) corresponding to two sides of the second bottom hole (420) and the discharge channel to apply corresponding magnetic fields to the draft beer during the draft beer flowing through the discharge channel.

5. The apparatus according to claim 1, wherein the lifting member (320) comprises an upper O-ring slot (**322*a*), in which an upper O-ring (322) is inserted, and a lower O-ring slot (324*a*), in which a lower O-ring (324) is inserted, that are separately formed at a predetermined interval, and a gas outlet hole (326) that penetrates the lifting member between the upper O-ring slot (322*a*) and the lower O-ring slot (324*a*) to discharge the carbon dioxide gas in the inner space (212) of the main body (210), the lifting member (320) comprising a gas channel (322) formed in the lifting member (320) to communicate the gas outlet hole (326) with the gas discharge pipe (340) inserted in the push button (330), and the gas channel being configured to move between a closed position in which the gas outlet hole (326) is closed by an inner peripheral surface of the upper plate (310) and an opened position in which the gas outlet hole (326) is exposed to the inner space (212) of the main body (210) when the lifting member (320) moves downward by the operation of the push button (330**) to selectively flow the carbon dioxide gas through the gas channel.

6. The apparatus according to claim 5, wherein the upper O-ring slot (**322*a*) in which the upper O-ring 322 is inserted is formed on the lifting member (320) at a predetermined interval with the lower O-ring slot (324*a*) in which the lower O-ring (324) is inserted, and the gas outlet hole (326) is penetrated between the upper O-ring slot (322*a*) and the lower O-ring slot (324*a*) to discharge the carbon dioxide gas in the inner space (212) of the main, body (210), when the push button (330) is pressed, the gas outlet hole (326) is exposed to the inner space (212) of the main body (210**).

* * * * *